United States Patent
Cheris et al.

(10) Patent No.: US 6,502,905 B2
(45) Date of Patent: Jan. 7, 2003

(54) FLOOR MAT AND INTEGRATED FOOT REST

(75) Inventors: Albert B. Cheris, Deerfield, IL (US); John Ford, Elk Grove Village, IL (US); Michael Goluszka, Inverness, IL (US)

(73) Assignee: Berol Corporation, Freeport, IL (US)

( * ) Notice: Subject to any disclaimer, the term of this patent is extended or adjusted under 35 U.S.C. 154(b) by 0 days.

(21) Appl. No.: 09/836,749

(22) Filed: Apr. 17, 2001

(65) Prior Publication Data

US 2002/0150719 A1 Oct. 17, 2002

(51) Int. Cl.[7] ............................................. A47C 16/02
(52) U.S. Cl. ........................ 297/423.46; 297/423.41; 296/75; 428/136; 428/99
(58) Field of Search ..................... 428/99, 136; 296/75, 296/97.23; 297/423.1, 423.14, 423.41, 423.39, 423.46

(56) References Cited

U.S. PATENT DOCUMENTS

| | | |
|---|---|---|
| 513,246 A | 1/1894 | Parliaman |
| 1,232,223 A | 7/1917 | Clarke |
| 1,525,864 A | 2/1925 | Huesman |
| 1,839,604 A | 1/1932 | Shear |
| 2,576,883 A | 11/1951 | Koski |
| 3,394,963 A | 7/1968 | Antonioli |
| 3,700,201 A | 10/1972 | O'Donnell |
| 3,785,702 A | 1/1974 | Buehring |
| 3,961,822 A | 6/1976 | Daniel |
| 4,046,419 A | 9/1977 | Schmitt |
| 4,910,818 A | 3/1990 | Grabill et al. |
| 4,984,838 A | 1/1991 | Kim |
| 4,991,908 A | 2/1991 | Krechel |
| 5,331,693 A | 7/1994 | Petersen et al. |
| 5,449,221 A * | 9/1995 | Stander .................. 297/423.1 |
| 5,826,941 A | 10/1998 | Olsen |

* cited by examiner

Primary Examiner—Alexander S. Thomas
(74) Attorney, Agent, or Firm—Marshall, Gerstein & Borun

(57) ABSTRACT

A plastic floor mat and foot rest unit is disclosed in which a front edge of the support surface of the foot rest is inserted through a slotted opening in the floor mat to the underside of the floor mat, and a latching projection is also inserted through the opening to latch the front edge of the support surface in the opening, yet permit its ready removal if desired. The rear edge of the support surface is also supported by a support plate to permit the incline angle of the foot rest support surface to be adjusted and to support the rear edge by the pile of the carpet upon which the floor mat and foot rest unit is to be used.

18 Claims, 2 Drawing Sheets

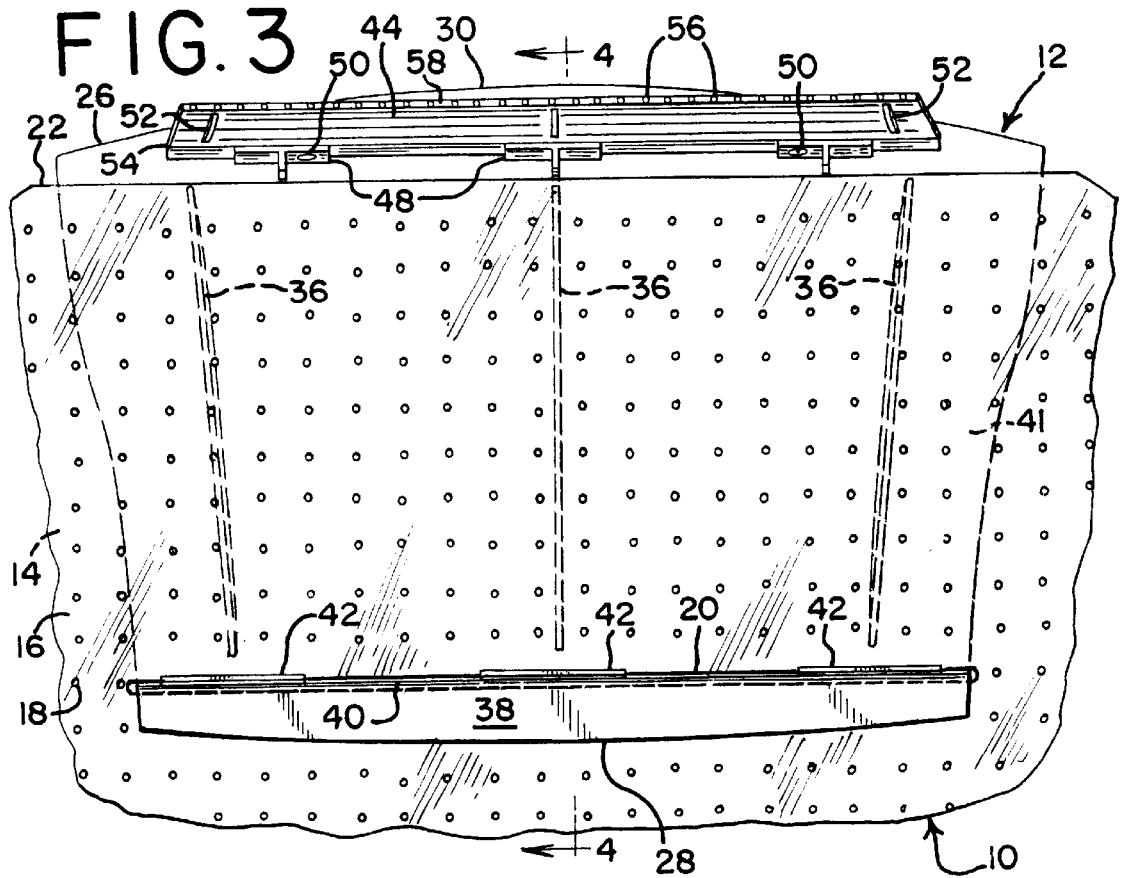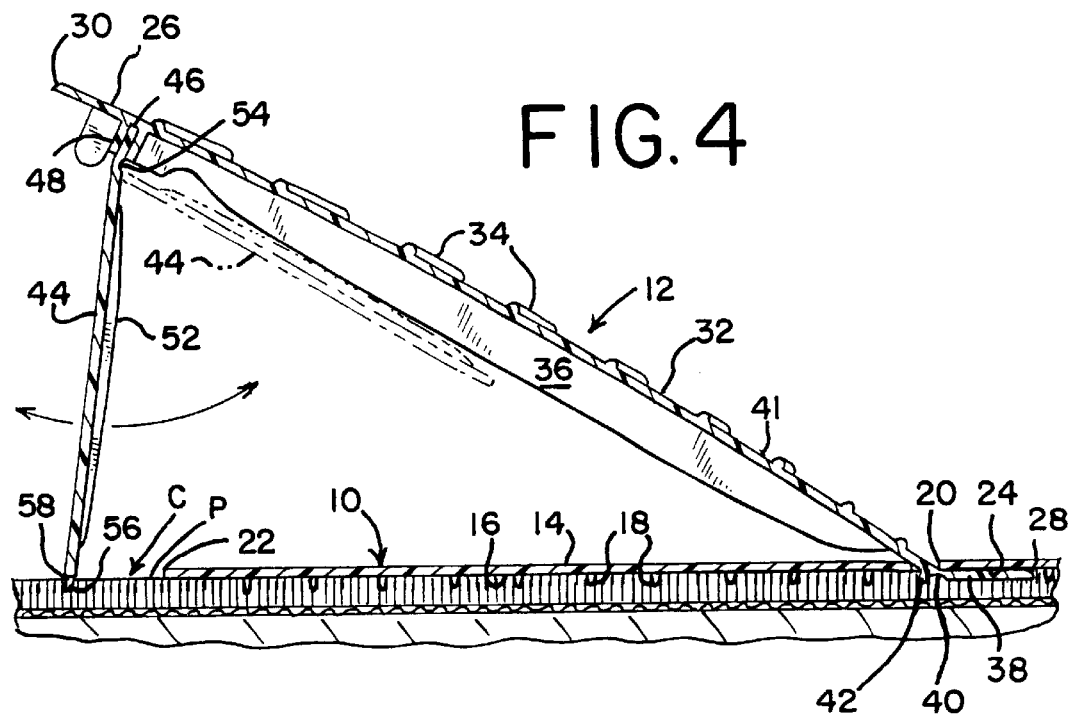

FLOOR MAT AND INTEGRATED FOOT REST

BACKGROUND AND SUMMARY OF THE INVENTION

The present invention relates to a floor mat and foot rest unit in which the foot rest is removably integrated with the floor mat.

Plastic floor mats are often placed under a desk chair to protect the floor or carpet and/or to permit relatively easy movement of the desk chair. Foot rests are also known. However, a problem which exists with a foot rest and floor mat combination is that the foot rest tends to slip or move on the smooth topside surface of the floor mat when foot pressure is placed against the foot rest.

In the floor mat and foot rest unit of the present invention, the foot rest may be simply and quickly anchored to and/or removed from the floor mat. When so anchored to the floor mat, the foot rest functions quite well in its resting and supporting function and without slipping or moving about on the smooth topside surface of the floor mat. Moreover, the incline of the support surface of the foot rest may be easily and simply adjusted to accommodate the comfort of the user, and the foot rest may be folded to minimize space requirements during shipping and storage.

In one principal aspect of the present invention, a floor mat and a foot rest unit comprises a substantially planar floor mat having an underside and a topside and having a slotted opening extending between the underside and topside and spaced from an edge of the mat, and a foot rest comprising a plate having front and rear edges and adapted to receive a foot of a user in a supporting and resting position. The front edge of the plate is removably positioned through the slotted opening with the front edge at the underside of the floor mat, and a major portion of the remainder of the plate and the rear edge is positioned at or above the topside of the floor mat. A support supports the plate adjacent its rear edge.

In another principal aspect of the present invention, cleats are on the underside of the floor mat for engaging a carpet upon which the floor mat may rest, and the underside of the floor mat is devoid of the cleats adjacent the slotted opening and front edge of the plate.

In still another principal aspect of the present invention, the cleats are of a given length, and the plate has a thickness which is not substantially greater than that given length.

In still another principal aspect of the present invention, the plate includes a flange which defines the front edge of the plate, a hinge, preferably a living hinge, for hinging the flange to the major portion of the plate, and the flange is positioned through the slotted opening at the underside of the floor mat.

In still another principal aspect of the present invention, a latching projection is on the plate adjacent to the slotted opening and at the underside of the floor mat to removably latch the plate to the floor mat.

In still another principal aspect of the present invention, the support supports the plate at an inclined angle to the topside of the floor mat.

In still another principal aspect of the present invention, the support is mounted to and extends from the plate, and the support includes a hinge, preferably a living hinge, adjacent the plate to permit the support to be adjusted to extend from the plate at differing angles.

In still another principal aspect of the present invention, the support is a plate.

In still another principal aspect of the present invention, the support supports the plate of the foot rest on a surface other than the floor mat.

In still another principal aspect of the present invention, the support includes cleats on an edge opposite the plate of the foot rest to engage a carpet to support the plate of the foot rest.

In still another principal aspect of the present invention, the plate of the foot rest is bowed upwardly from the topside of the floor mat.

In still another principal aspect of the present invention, a floor mat and foot rest unit comprises a substantially planar floor mat, a foot rest comprising a plate having front and rear edges and adapted to receive a foot of a user in a supporting and resting position, the plate being fixed adjacent the front edge to the floor mat, and a support for supporting the plate adjacent its rear edge and on a surface other than the floor mat.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 3 is a broken bottom plan view of the floor mat and foot rest unit as substantially shown in FIG. 2; and FIG. 4 is a broken cross-sectioned side elevation view of the floor mat and foot rest unit as viewed substantially along line 4—4 of FIG. 3.

DETAILED DESCRIPTION OF THE PREFERRED EMBODIMENT

Figure 1:
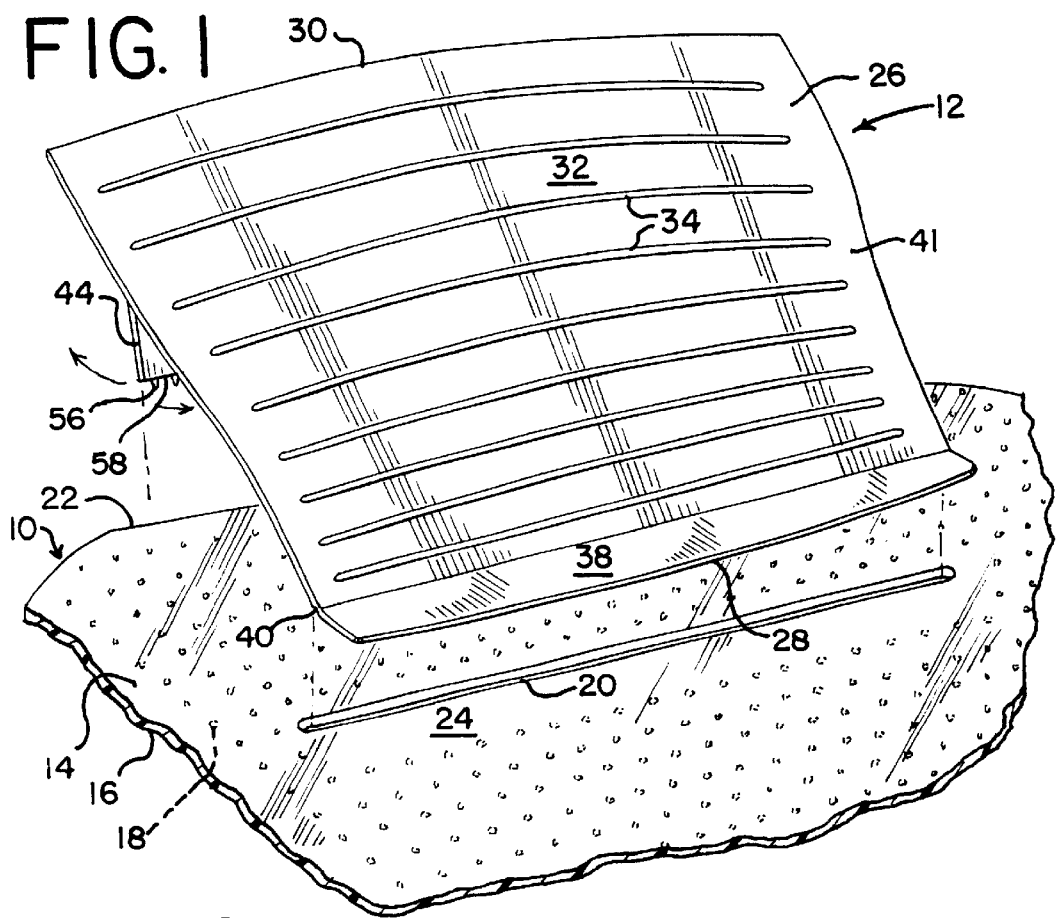
FIG. 1 is a broken exploded perspective view of a preferred floor mat and foot rest unit of the present invention.
Figure 2:
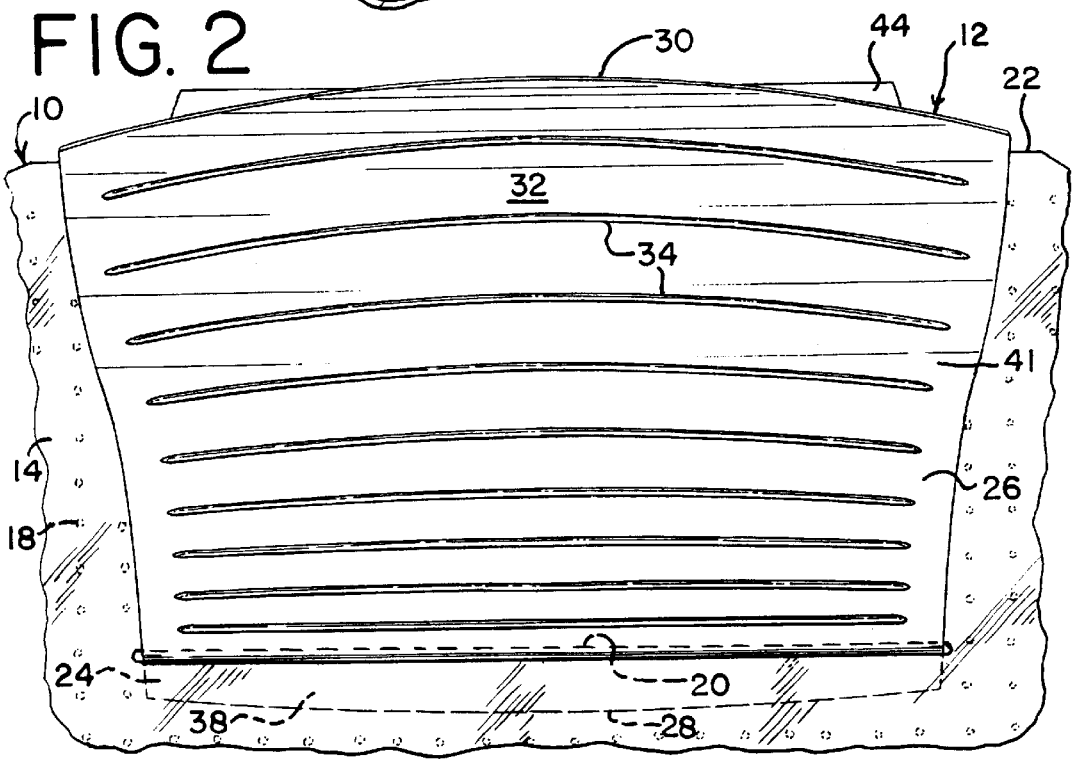
FIG. 2 is a broken top plan view of the unit as substantially shown in FIG. 1, but in which the foot rest has been anchored to the floor mat.

The preferred embodiment of unit of the present invention includes a floor mat 10 with a foot rest 12 integrated with the floor mat to comfortably support the feet of the user.

The floor mat 10 may be of generally conventional design with the exceptions to be noted hereafter. The floor mat may typically be formed of plastic, preferably more or less transparent, and be of a size and shape to readily accommodate the usual range of travel of a standard swivel office desk chair on rollers on generally planar topside 14 of the floor mat. The underside 16 of the floor mat 10 is also preferably substantially planar except for a plurality of downwardly extending cleats 18 arranged in a geometric pattern as shown in the drawings. The cleats 18 extend downwardly into the pile P of the carpet C upon which the floor mat is to rest so as to anchor the floor mat 10 against sliding on the surface of the carpet during use.

The floor mat thus far described is generally conventional. However, the floor mat 10 of the present invention includes some modifications in order to uniquely adapt it to accommodate the foot rest 12 of the present invention. In this regard, the floor mat 10 of the invention includes an elongate slotted opening 20 toward one edge 22 of the floor mat, but spaced from that edge. In addition, an area 24 adjacent the slotted opening 20 as viewed in the drawings is also preferably devoid of any cleats 18 for reasons to be described in further detail to follow. The area 24 may be voided of cleats either by simply failing to form cleats in the area during molding, or the cleats previously formed in the area 24 may be simply cut or ground off after forming.

The preferred embodiment of foot rest 12 of the present invention comprises a generally planar plate 26 having a front edge 28 and a rear edge 30, and an upper surface 32 upon which one or both feet of the user may be supported in a resting position. The upper support surface 32 also preferably includes a plurality of laterally extending ribs 34 which act to either or both provide traction for the user's feet to prevent slippage and/or to reinforce the strength of the plate 26 which is preferably formed of a plastic material. In addition, longitudinally extending reinforcing ribs 36 are also preferably provided on the underside of the plate as seen in FIG. 3 to also reinforce and strengthen the plate 26. The plate 26 also preferably has a slightly upward bow as best seen in FIG. 4 to preload it in a direction opposite to the forces which it will bear in use. This bow will further strengthen the foot rest 12.

The front edge 28 of the plate 26 is preferably formed by a relatively narrow flange 38 which extends across the width of the plate 26. The flange 38 is preferably defined by a line of narrowing of the thickness of the plate material at 40 to define what is referred to in the art as a "living hinge". The living hinge 40 extends across the width of the plate 26 and in spaced relation to the front. edge 28 and permits the flange 38 to rotate about the hinge from the remaining major portion 41 of the plate 26, as best seen in FIGS. 1 and 4. The flange 38 is adapted to be inserted through the slotted opening 20 to the underside 16 of the floor mat as will be described in further detail in the description of the assembly of the unit of the invention to follow.

One or more elongate latching projections 42 are also preferably molded integral to the underside of the plate 26. The latching projections 42 extend downwardly adjacent and parallel to the living hinge 40, as best seen in FIGS. 3 and 4. The latching projections 42 are also designed to fit through the slotted opening 20 to the underside 16 of the floor mat 10, and to engage the rear edge of the slotted opening to removably latch the plate 26 in the slotted opening 20.

The foot rest 12 also includes a support preferably in the form of a plate 44 adjacent the rear edge 30 of the plate 26. The top edge 46 of the support plate 44 is preferably non-removably attached at the underside of the plate 26 by way of several spaced brackets 48, as best seen in FIGS. 3 and 4. The brackets are also preferably molded integrally with the underside of the plate 26 and are configured to receive the top edge 46 of the support plate 44 so that it may be held with conventional plastic rivets 50 or the like, as best seen in FIG. 3.

The support plate 44 also preferably includes one or more reinforcing ribs 52 to strengthen the plate. The thickness of the plate 44 is also preferably narrowed at 54 over its width to form a living hinge similar to the living hinge previously described. This permits the support plate 44 to be rotated through any one of several angular positions to adjust the angle of the foot rest surface to accommodate the comfort of the user. The living hinge 54 may also permit the support plate 44 to be rotated to the position shown in dot and dash in FIG. 4 to minimize space consumption during shipping or storage. Finally, a plurality of cleats 56 are also preferably provided along the lower edge 58 of the support plate 44 to anchor the support plate into the pile P of the carpet C. The ability to anchor the support plate to other than the floor mat and the provision of the hinge 54 facilitate the angular adjustment of the foot rest support surface 32.

Although it is believed from the foregoing description that the assembly of the preferred embodiment of floor mat and foot rest unit of the present invention will be apparent to those skilled in the art, a brief description of a preferred assembly follows.

The front edge 28 and its flange 38 of the foot rest plate 26 are inserted from the topside 14 of the floor mat 10 through the slotted opening 20. The flange 38 is capable of rotation about the living hinge 40 so that it will bear upwardly against the underside 16 of the floor mat 10 following insertion through the slotted opening 20 and once the unit is placed to rest against the pile P of the carpet C. Because the area 24 on the underside of the floor mat is devoid of cleats 18, the upper face of the flange 38 will be flush with the underside 16 of the floor mat 10. The length of the cleats 18 is preferably about equal to or not substantially greater than the thickness of the flange 38. Thereby, the topside 14 of the floor mat will not be distorted in use.

Also as previously mentioned, the latching projections 42 are also inserted through the slotted opening 20 together with the flange 38. These latching projections 42 are preferably molded to extend perpendicularly from the lower face of the plate 26. Because of the angled disposition of the plate 26, the latching projections will therefore extend backwardly and in a direction toward the edge of the mat 22 to function as elongated barbs which latch the foot rest 12 in place against the rear edge of the slotted opening 20. However, because of the flexibility of the latching projections 42 and the floor mat around the allotted opening 20, the foot rest 12 may subsequently be easily and quickly removed from the floor mat simply by pulling the latching projections 42 and flange 38 from the slotted opening 20 if it is later desired to restore, reship or move the unit from its current position.

Once the front edge 28 of the foot rest has been latched in the opening 20 in the floor mat 10, the support plate 44 may be rotated from its shipping position, as shown in dot and dash in FIG. 4, about its living hinge 54 to any desired position to fix the incline angle of the major portion 41 of the plate 26 for the maximum comfort of the user. Once the adjustment of the support plate 44 is completed, the cleats 56 of the support plate 44 are pushed into the pile P of the carpet C to anchor the support plate 44 in its final position. Because the support plate 44 supports the plate 26 independently of the floor mat 10, the provision for anchor sites for the support plate 44 on the floor mat is unnecessary, and because the cleats 56 may selectively anchor the support plate 44 at any one of a number of locations in the pile P of the carpet C, a wide range of adjustment positions are possible with a minimum of structural alterations to the floor mat.

From the foregoing it will be appreciated that the floor mat and foot rest unit of the preferred embodiment of the present invention will maximize compactness for storage and shipment, is easy to manufacture and assemble and will preclude movement or other slippage of the foot rest on the smooth surface of the floor mat when foot pressure is placed against the foot rest by the user during use. Moreover, the foot rest, although secure against movement in use, may still be simply and easily removed from the floor mat once installed to facilitate reshipment or restorage of the unit of the invention. Finally, it will also be appreciated that the angular disposition of the foot support surface 32 may be simply and easily adjusted to maximize the comfort of the user.

It also will be understood that the embodiment of the present invention which has been described is merely illustrative of a few of the applications of the principles of the invention. Numerous modifications may be made by those skilled in the art without departing from the true spirit and scope of the invention.

We claim:

1. A floor mat and foot rest unit, comprising
    a substantially planar floor mat having an underside and a topside and having a slotted opening extending between the underside and topside and spaced from an edge of the mat;
    a foot rest comprising a plate having front and rear edges and adapted to receive a foot of a user in a supporting and resting position, said front edge of said plate being removably positioned through said slotted opening with said front edge at the underside of the floor mat, and a major portion of the remainder of the plate and the rear edge being positioned at or above the topside of the floor mat; and
    a support for supporting said plate adjacent its rear edge.

2. The unit of claim 1, including cleats on said underside of said floor mat for engaging a carpet upon which the floor mat may rest, said underside of said floor mat being devoid of said cleats adjacent said slotted opening and front edge of said plate.

3. The unit of claim 2, wherein said cleats are of a given length, and said plate has a thickness which is not substantially greater than said given length.

4. The unit of claim 2, wherein said plate includes a flange which defines the front edge of said plate, a hinge for hinging said flange to said major portion of said plate, and wherein said flange is positioned through said slotted opening at the underside of said floor mat which is devoid of said cleats.

5. The unit of claim 1, wherein said plate includes a flange which defines said front edge of said plate, a hinge for hinging said flange to said major portion of said plate, and wherein said flange is positioned through said slotted opening at the underside of said floor mat.

6. The unit of claim 5, wherein said hinge is an elongate living hinge.

7. The unit of claim 5, including a latching projection an said plate adjacent to said slotted opening, at said underside of said floor mat and adjacent to said hinge to removably latch said plate to said floor mat.

8. The unit of claim 1, including a latching projection on said plate adjacent to said slotted opening and at said underside of said floor mat to removably latch said plate to said floor mat.

9. The unit of claim 1, wherein said support supports said plate at an inclined angle to the topside of said floor mat.

10. The unit of claim 9, wherein said support is mounted to and extends from said plate, said support includes a hinge adjacent said plate to permit said support to be adjusted to extend from said plate at differing angles, said support supports said plate on a surface other than said floor mat, and said support is also a plate.

11. The unit of claim 10, wherein said support includes cleats on an edge opposite said plate of said foot rest to engage a carpet to support said plate of said foot rest.

12. The unit of claim 11, including cleats on said underside of said floor mat for engaging a carpet upon which the floor mat may rest, said underside of said floor mat being devoid of said cleats adjacent said slotted opening and front edge of said plate;
    said cleats are of a given length, and said plate has a thickness which is not substantially greater than said given length;
    said plate includes a flange which defines said front edge of said plate, a hinge for hinging said flange to said major portion of said plate, and wherein said flange is positioned at the underside of said floor mat which is devoid of said cleats; and
    a latching projection on said plate adjacent to said slotted opening at said underside of said floor mat and adjacent to said hinge to removably latch said plate to said floor mat.

13. The unit of claim 1, wherein said support is mounted to and extends from said plate, and said support includes a hinge adjacent said plate to permit said support to be adjusted to extend from said plate at differing angles.

14. The unit of claim 13, wherein said hinge is a living hinge.

15. The unit of claim 1, wherein said support is a plate.

16. The unit of claim 1, wherein said support supports said plate on a surface other than said floor mat.

17. The unit of claim 16, wherein said support includes cleats on an edge opposite said plate to engage a carpet to support said plate.

18. The unit of claim 1, wherein said plate is bowed upwardly from the topside of said floor mat.

* * * * *